(12) United States Patent
Luke et al.

(10) Patent No.: US 9,969,270 B2
(45) Date of Patent: May 15, 2018

(54) SYSTEMS AND METHODS OF ADAPTIVE REGENERATIVE BRAKING AND COLLISION AVOIDANCE FOR ELECTRICALLY POWERED VEHICLES

(71) Applicant: Gogoro Inc., Hong Kong (CN)

(72) Inventors: Hok-Sum Horace Luke, Mercer Island, WA (US); Matthew Whiting Taylor, North Bend, WA (US)

(73) Assignee: Gogoro Inc., Hong Kong (CN)

( * ) Notice: Subject to any disclaimer, the term of this patent is extended or adjusted under 35 U.S.C. 154(b) by 70 days.

(21) Appl. No.: 14/965,562

(22) Filed: Dec. 10, 2015

(65) Prior Publication Data

US 2016/0167519 A1 Jun. 16, 2016

Related U.S. Application Data

(60) Provisional application No. 62/090,234, filed on Dec. 10, 2014.

(51) Int. Cl.
  *B60L 3/00* (2006.01)
  *B60L 7/18* (2006.01)
  (Continued)

(52) U.S. Cl.
  CPC .............. *B60L 3/0015* (2013.01); *B60L 7/18* (2013.01); *B60L 7/26* (2013.01); *B60L 11/1861* (2013.01);
  (Continued)

(58) Field of Classification Search
  CPC ....... B60L 3/0015; B60L 7/18; B60L 11/1809
  See application file for complete search history.

(56) References Cited

U.S. PATENT DOCUMENTS

| 5,314,037 A | 5/1994 | Shaw et al. |
| 2013/0090822 A1* | 4/2013 | Schwindt ........... B60K 31/0008 701/70 |

FOREIGN PATENT DOCUMENTS

| CN | 102897155 | 1/2014 |
| GB | 2508668 | 6/2014 |

(Continued)

OTHER PUBLICATIONS

International Search Report and Written Opinion dated Mar. 29, 2016 for corresponding International Application No. PCT/US2015/065051, 17 pages.

(Continued)

*Primary Examiner* — Basil T. Jos
(74) *Attorney, Agent, or Firm* — Perkins Coie LLP (57) ABSTRACT

Electrically powered vehicles may be equipped with both mechanical braking systems and regenerative braking systems. Regenerative braking systems improve vehicle efficiency by returning a portion of the energy lost in deceleration to the battery of the electrically powered vehicle. An electrically powered vehicle controller that provides collision avoidance functionality can maximize the energy returned to the battery of the electrically powered vehicle by maximizing the use of regenerative braking for collision avoidance. A first braking mode can include only regenerative braking for objects greater than the minimum regenerative stopping distance. A second braking mode can include composite braking using both mechanical and regenerative braking. The electrically powered vehicle controller determines the maximum regenerative braking level at least based on data provided by battery charge level or battery state sensors.

23 Claims, 4 Drawing Sheets

(51) Int. Cl.
  *B60L 11/18* (2006.01)
  *B60L 7/26* (2006.01)
  *B60L 15/20* (2006.01)
  *B60W 10/184* (2012.01)
  *B60W 10/20* (2006.01)
  *B60W 30/09* (2012.01)
  *B60W 50/00* (2006.01)

(52) U.S. Cl.
  CPC ....... *B60L 15/2009* (2013.01); *B60L 15/2045* (2013.01); *B60W 10/184* (2013.01); *B60W 10/20* (2013.01); *B60W 30/09* (2013.01); *B60L 2240/12* (2013.01); *B60L 2240/24* (2013.01); *B60L 2240/36* (2013.01); *B60L 2240/642* (2013.01); *B60L 2240/645* (2013.01); *B60L 2240/647* (2013.01); *B60L 2240/662* (2013.01); *B60L 2240/667* (2013.01); *B60L 2240/68* (2013.01); *B60L 2240/80* (2013.01); *B60L 2250/10* (2013.01); *B60L 2250/16* (2013.01); *B60L 2260/32* (2013.01); *B60L 2260/50* (2013.01); *B60W 2050/0094* (2013.01); *Y02T 10/7005* (2013.01); *Y02T 10/7275* (2013.01)

(56) References Cited

FOREIGN PATENT DOCUMENTS

| JP | 7-163008 A | 6/1995 |
| JP | 2005-253157 A | 9/2005 |
| JP | 2011-255795 A | 12/2011 |
| JP | 2014-155234 A | 8/2014 |
| WO | 2014/048042 A1 | 4/2014 |

OTHER PUBLICATIONS

Boerboom, "Electric Vehicle Blended Braking maximizing energy recovery while maintaining vehicle stability and maneuverability," Master's thesis, Chalmers University of Technology, Göteborg, Sweden, Jan. 2012, 93 pages.

Chen et al., "Intelligent Regenerative Braking Control of Hybrid Buses," International Conference on Engineering and Meta-Engineering: ICEME 2010, Apr. 6-9, 2010, Orlando, Florida, 5 pages.

\* cited by examiner

SYSTEMS AND METHODS OF ADAPTIVE REGENERATIVE BRAKING AND COLLISION AVOIDANCE FOR ELECTRICALLY POWERED VEHICLES

BACKGROUND

Technical Field

The present disclosure generally relates to vehicular collision avoidance systems and methods.

Description of the Related Art

Many electrically powered vehicles include two independent braking systems. A first braking system converts kinetic energy recovered from slowing the vehicle into electrical energy which is stored in an on-board storage cell, such energy recovery braking systems are often referred to as regenerative braking systems. On electrically powered vehicles, such regenerative braking systems frequently use the electric traction drive motor as a generator. Energy produced by the generator is stored in on-board energy storage cells which may or may not be removable from the vehicle.

A second braking system applies mechanical force to slow the vehicle. Such systems are usually of conventional design such as those found on gasoline powered vehicles. Such mechanical braking systems convert the kinetic energy recovered from slowing the vehicle into heat which is not recovered and is instead dissipated to the atmosphere.

Some vehicles are equipped with a variety of sensors and controllers that perform the necessary functions that permit a vehicle operator to safely and efficiently operate the vehicle. Newer sensors and controllers frequently provide active collision warning or collision avoidance output in response to an object present in the travel path of the vehicle.

BRIEF SUMMARY

Vehicular collision avoidance systems typically rely upon one or more sensor systems, such as one or more ultrasonic systems, one or more radar systems, one or more lidar systems, or the like to detect the presence of objects in the vehicular travel path or the imminent presence of an object in the vehicular travel path. Such objects can include animate objects such as pedestrians or animals or inanimate objects such as other vehicles, barricades, potholes, or other road hazards. Upon detecting the presence of such an object the vehicular controller autonomously performs actions such as braking or steering the vehicle to avoid or reduce the severity of a collision with the object.

Collision avoidance in electrically powered vehicles presents a unique opportunity to increase efficiency using an automated collision avoidance system in which the energy recovery through regenerative braking is maximized based on the operational status of one or more vehicular systems. A vehicle controller receives inputs such as road surface type, road surface condition, road conditions, battery charge levels, vehicle loading, regenerative braking system parameters, mechanical braking system parameters, atmospheric conditions, and using at least some of the parameters determines on a continuous, intermittent, or periodic basis a number of braking distances.

For example, the vehicle controller may determine a minimum regenerative stopping distance at a first rate of deceleration using only regenerative braking and a minimum composite stopping distance at a second rate of deceleration that is greater than the first rate of deceleration using both regenerative and mechanical braking systems. Between the minimum regenerative stopping distance and the minimum composite stopping distance, the controller can maximize the use of regenerative braking and minimize the use of mechanical braking to provide a rate of deceleration that falls between the first rate of deceleration (regenerative braking alone) and the second rate of deceleration (maximum composite braking which yields the shortest possible stopping distance).

The vehicle controller can continuously, intermittently, or periodically determine an obstruction threshold distance at or below which an object either in the travel path of the vehicle or approaching the travel path of the vehicle initiates braking action. An object either in the travel path or approaching the travel path of the vehicle beyond the obstruction threshold distance does not initiate autonomous braking. The obstruction threshold distance is typically greater than the regenerative stopping distance to permit stopping the vehicle using only regenerative braking whenever possible. The vehicle controller can determine the obstruction threshold distance based on any number of inputs including the ability of the energy storage device (i.e., secondary battery) to accept a charge (e.g., battery charge level, battery temperature, battery cycles, and similar); ambient conditions (e.g., rain or other liquid covered surface, snow, ice, and similar); road conditions (e.g., wet, improved, unimproved, sloping upward, sloping downward, and similar); and vehicular conditions (e.g., mechanical brake pad wear, mechanical braking system efficiency losses, vehicular control, vehicular anti-lock brakes, vehicle loading/load distribution). By updating the determined minimum composite stopping distance, determined minimum regenerative stopping distance, and the determined obstruction threshold distance values, the vehicle controller is able to determine the degree of usage of the vehicular regenerative braking system and vehicular mechanical braking system to safely, efficiently, and autonomously slow or stop the vehicle prior to a collision with an object present in the travel path of the vehicle.

Advantageously, such a system provides for maximum energy recovery via regenerative braking when the distance between the object and the vehicle falls between the obstruction threshold distance and the minimum regenerative stopping distance. Such a system further maximizes the use of regenerative braking in a composite braking mode where both the regenerative braking system and the mechanical braking systems are used, such as when the distance between object and the vehicle falls between the minimum composite braking distance (i.e., the determined shortest composite braking distance considering ambient, road, and vehicular factors and using both mechanical and regenerative systems without consideration of the quantity of energy recovered via the regenerative braking system) and the minimum regenerative braking distance.

A collision avoidance system for use with an electrically powered vehicle may be summarized as including: a number of sensors, each of the number of sensors which, in operation, provide signals to a vehicle controller; at least one controller, communicably coupled to the number of sensors, that, in operation, receives signals from each of the number of sensors; a nontransitory storage medium that includes controller-executable instructions, that when executed by the at least one controller, cause the at least one controller to: determine a value representative of a minimum regenerative stopping distance achievable using only a regenerative braking system; determine a value representative of a minimum composite stopping distance achievable using a combination of a mechanical braking system and the regenerative braking system; determine a value representative of an obstruction threshold distance that is equal to or greater than the determined minimum regenerative stopping distance; responsive to receipt of a signal that includes data indicative of at least one object in a travel path of the vehicle or the imminent entry of at least one object into the travel path of the vehicle from one or more of the number of sensors, determine a distance to the at least one object; responsive to a determination that the distance to the at least one object is less than the determined obstruction threshold distance and greater than the determined minimum regenerative stopping distance, autonomously enter a first braking mode in which the vehicle is slowed at a first rate of deceleration using only the regenerative braking system.

The instructions may further cause the at least one controller to: prior to placing the vehicle in the first braking mode, generate a first human-perceptible output indicative of the first braking mode. The controller may determine the minimum regenerative stopping distance and the minimum composite stopping distance based, at least in part, on data supplied by one or more sensors or systems external to the electrically powered vehicle. The instructions may further cause the at least one controller to: responsive to a determination that the distance to the at least one object is less than the determined minimum regenerative stopping distance, autonomously determine a level of regenerative braking to apply and a level of mechanical braking to apply that stops the vehicle prior to contact with the at least one object and maximizes the level of regenerative braking; and place the vehicle in a second braking mode in which the vehicle slows at a second rate of deceleration that is greater than the first rate of deceleration by applying the regenerative braking system at the determined level of regenerative braking and applying the mechanical braking system at the determined level of mechanical braking. The instructions may further cause the at least one controller to: prior to placing the vehicle in the second braking mode, provide a second human-perceptible output indicative of the second braking mode. The instructions may further cause the at least one controller to: responsive to a determination that the distance to the at least one object is less than the determined minimum composite stopping distance, autonomously adjust one or more non-steering and non-braking vehicular systems. The number of sensors may include an object detection sensor, an available battery charge sensor, and at least one of: a battery state sensor; a battery temperature sensor; a battery current sensor; a mechanical braking system sensor; an ambient environmental condition sensor; a road condition sensor; a load sensor; one or more vehicle accelerometers; a steering position sensor; a load distribution sensor; or a suspension travel sensor. The number of sensors may include an object detection sensor and an available battery charge sensor; and wherein the controller determines the minimum regenerative stopping distance and the minimum composite stopping distance based, at least in part, on the battery charge level. The instructions that cause the at least one controller to determine a value representative of a minimum regenerative stopping distance achievable using only the regenerative braking system, may cause the at least one controller to: determine a value representative of a minimum regenerative stopping distance achievable using the on-board regenerative braking system on an intermittent, periodic, or continuous basis. The instructions that cause the at least one controller to determine a value representative of an obstruction threshold distance that is equal to or greater than the determined minimum regenerative stopping distance, may cause the at least one controller to: determine a value representative of an obstruction threshold distance that is greater than the determined minimum regenerative stopping distance on an intermittent, periodic, or continuous basis.

A collision avoidance method for use with an electrically powered vehicle may be summarized as including: determining, by at least one controller, a value representative of a minimum regenerative stopping distance achievable using only a regenerative braking system of the electrically powered vehicle; determining, by the at least one controller, a value representative of a minimum composite stopping distance achievable using a combination of a mechanical braking system and the regenerative braking system of the electrically powered vehicle; determining, by the at least one controller, a value representative of an obstruction threshold distance that is equal to or greater than the determined minimum regenerative stopping distance; receiving, by the at least one controller, at least one signal including data indicative of at least one object in a travel path of the vehicle or the imminent entry of at least one object into the travel path of the electrically powered vehicle using one or more of a number of sensors communicably coupled to the at least one controller; determining, by the at least one controller, a value representative of a distance between the electrically powered vehicle and the at least one object; determining, by the at least one controller, whether the distance between the electrically powered vehicle and the at least one object is less than the determined obstruction threshold distance and greater than the determined minimum regenerative stopping distance; and responsive to determining the distance between the electrically powered vehicle and the at least one object is less than the determined obstruction threshold distance and greater than the determined minimum regenerative stopping distance by the at least one controller, autonomously placing the vehicle in a first braking mode in which the vehicle is slowed at a first rate of deceleration using only the regenerative braking system.

The collision avoidance method may further include: prior to entering the first braking mode, generating, by the at least one controller on a vehicular user interface, a first human-perceptible output indicative of the first braking mode. Determining, by the at least one controller, a value representative of a minimum composite stopping distance achievable using a combination of a mechanical braking system and the regenerative braking system of an electrically powered vehicle may include: determining, by the at least one controller, the minimum composite stopping distance using the mechanical braking system, the regenerative braking system, and data supplied by one or more sensors or systems external to the electrically powered vehicle. The collision avoidance method may further include: responsive to a determination, by the at least one controller, that the distance to the at least one object is less than the determined minimum regenerative stopping distance, autonomously determining a level of regenerative braking to apply and a level of mechanical braking to apply to stop the vehicle prior to contact with the at least one object and maximize the level of regenerative braking; and placing, by the at least one controller, the electrically powered vehicle in a second braking mode in which the vehicle slows at a second rate of deceleration that is greater than the first rate of deceleration by applying the regenerative braking system at the determined level of regenerative braking and applying the mechanical braking system at the determined level of mechanical braking. The collision avoidance method may further include: prior to entering the second braking mode, generating, by the at least one controller on a vehicular user interface, a second human-perceptible output indicative of the second braking mode. The collision avoidance method may further include: responsive to determining the distance to the at least one object is less than the determined minimum composite stopping distance, by the at least one controller, autonomously adjusting, by the at least one controller, one or more non-steering and non-braking vehicular systems. Determining a value representative of a minimum composite stopping distance achievable using a combination of a mechanical braking system and the regenerative braking system of the electrically powered vehicle may include: determining, by the at least one controller, the value representative of a minimum composite stopping distance achievable using the combination of the mechanical braking system and the regenerative braking system of the electrically powered vehicle based at least in part on data provided by a battery charge level sensor. Determining, by the at least one controller, a value representative of a minimum regenerative stopping distance achievable using a regenerative braking system of the electrically powered vehicle may include: determining, by the at least one controller, the value representative of the minimum regenerative stopping distance achievable using the on-board regenerative braking system of the electrically powered vehicle based at least in part on data provided by a battery charge level sensor. Determining, by the at least one controller, a value representative of a minimum composite stopping distance achievable using a combination of a mechanical braking system and the regenerative braking system of the electrically powered vehicle may include: determining, by the at least one controller, the value representative of the minimum composite stopping distance achievable using the combination of the mechanical braking system and the regenerative braking system of the electrically powered vehicle based at least in part on data provided by a battery state sensor. Determining, by the at least one controller, a value representative of a minimum composite stopping distance achievable using a combination of a mechanical braking system and the regenerative braking system of the electrically powered vehicle may include: determining, by the at least one controller, on an intermittent, periodic, or continuous basis, the value representative of the minimum stopping distance achievable using a combination of the mechanical braking system and the regenerative braking system of the electrically powered vehicle. Determining, by the at least one controller, a value representative of an obstruction threshold distance that is greater than the determined minimum regenerative stopping distance may include: determining, by the at least one controller, on an intermittent, periodic, or continuous basis, the value representative of the obstruction threshold distance that is equal to or greater than the determined minimum regenerative stopping distance.

A collision avoidance system for use with an electrically powered vehicle may be summarized as including: a number of sensors, each of the number of sensors which, in operation, provide signals to a vehicle controller; at least one controller, communicably coupled to the number of sensors, that, in operation, receives signals from each of the number of sensors; a nontransitory storage medium that includes controller-executable instructions, that when executed by the at least one controller, cause the at least one controller to: determine, using at least some of the signals received from the number of sensors, a value representative of a minimum regenerative stopping distance achievable using only a regenerative braking system; determine, using at least some of the signals received from the number of sensors, a value representative of a minimum composite stopping distance achievable using a mechanical braking system in combination with the regenerative braking system; determine a value representative of an obstruction threshold distance that is greater than the determined minimum regenerative stopping distance; responsive to receipt of a signal that includes data indicative of at least one object in a travel path of the vehicle or the imminent entry of at least one object into the travel path of the vehicle from one or more of the number of sensors, determine a distance to the at least one object; responsive to a determination that the distance to the at least one object is less than the determined obstruction threshold distance and greater than the determined minimum regenerative stopping distance, autonomously enter a first braking mode in which the electrically powered vehicle is slowed at a first rate of deceleration using only the regenerative braking system; responsive to a determination that the distance to the at least one object is less than the determined minimum regenerative stopping distance, autonomously enter a second braking mode in which the electrically powered vehicle is slowed at a second rate of deceleration, which is greater than the first rate of deceleration using both the regenerative braking system and the mechanical braking system; and responsive to a determination that the distance to the at least one object is less than the determined composite braking minimum stopping distance, autonomously place the vehicle in a third braking mode in which the vehicle is slowed at a third rate of deceleration that is greater than the second rate of deceleration using a combination of the mechanical braking system and the regenerative braking system.

A collision avoidance method for use with an electrically powered vehicle may be summarized as including: determining, by at least one vehicle controller, using signals received from a number of sensors, a value representative of a minimum regenerative stopping distance achievable using only a regenerative braking system; determining, by the at least one vehicle controller, a value representative of a minimum composite braking stopping distance achievable using a mechanical braking system in combination with the regenerative braking system; determining, by the at least one vehicle controller, a value representative of an obstruction threshold distance that is at least equal to the determined minimum regenerative braking stopping distance; receiving, by the at least one vehicle controller, a signal that includes data indicative of at least one object in a travel path of the vehicle or the imminent entry of at least one object into the travel path of the vehicle; determining, by the at least one vehicle controller, a value representative of a distance between the electrically powered vehicle and the at least one object; determining whether the value representative of the distance to the at least one object is less than the determined obstruction threshold distance and greater than the determined minimum regenerative stopping distance; responsive to determining that the value representative of the distance to the at least one object is less than the determined obstruction threshold distance and greater than the determined minimum regenerative stopping distance, autonomously entering a first braking mode in which the electrically powered vehicle is slowed at a first rate of deceleration using only the on-board regenerative braking system; determining whether the value representative of the distance to the at least one object is less than the determined minimum regenerative stopping distance; responsive to a determination that the distance to the at least one object is less than the determined minimum regenerative stopping distance, autonomously entering a second braking mode in which the electrically powered vehicle is slowed at a second rate of deceleration, which is greater than the first rate of deceleration using both the regenerative braking system and the mechanical braking system; and responsive to a determination that the distance to the at least one object is less than the determined minimum composite stopping distance, autonomously entering a third braking mode in which the vehicle is slowed at a third rate of deceleration that is greater than the second rate of deceleration using a combination of the mechanical braking system and the regenerative braking system.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with various vehicular sensors including sensors useful for object detection, sensors useful for assessing atmospheric conditions, sensors useful for assessing road conditions and sensors useful for assessing vehicular conditions have not been shown or described in detail to avoid unnecessarily obscuring descriptions of the embodiments.

Additionally, portable electric energy storage devices (i.e., secondary or rechargeable batteries, supercapacitors or ultracapacitors); communications technologies and/or protocols; power converters including but not limited to transformers, rectifiers, DC/DC power converters, switch mode power converters; design and structure of vehicle components; wired and wireless communications protocols; controllers, and communications systems, structures, and networks have not been shown or described in detail to avoid unnecessarily obscuring descriptions of the embodiments.

As used herein, "portable electric energy storage device" or a reference to one or more "portable electric energy storage devices" can refer to any type of current or future developed secondary electrical energy storage device, such as one or more interconnected lithium ion cells, one or more interconnected nickel/cadmium cells, one or more interconnected lead/acid cells, one or more interconnected nickel/metal hydride cells, one or more interconnected supercapacitors, one or more interconnected ultracapacitors, and the like.

As used herein "regenerative braking system" refers to any device, system, or combination of systems and devices capable of reducing the velocity of an electrically powered vehicle via regenerative braking that converts at least a portion of vehicular kinetic energy to energy of a form suitable for temporary or long term storage in one or more electrical energy storage devices carried on-board the electrically powered vehicle. In some instances, the one or more electrical energy storage devices can include the primary electrical energy storage devices used to power the vehicle. In some instances, the one or more electrical energy storage devices can include electrical energy storage devices used for purposes other than as a primary power source for the electrically powered vehicle.

As used herein "mechanical braking system" refers to any device, system, or combination of systems and devices capable of reducing the velocity of an electrically powered vehicle via frictional braking that converts at least a portion of vehicular kinetic energy to heat which is dissipated to the atmosphere.

As used herein "composite braking system" refers to any device, system, or combination of systems and devices capable of reducing the velocity of an electrically powered vehicle via any combination of regenerative braking systems and mechanical braking systems.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act or structure.

The headings and Abstract of the Disclosure provided herein are for convenience only and do not interpret the scope or meaning of the embodiments.

Figure 1:
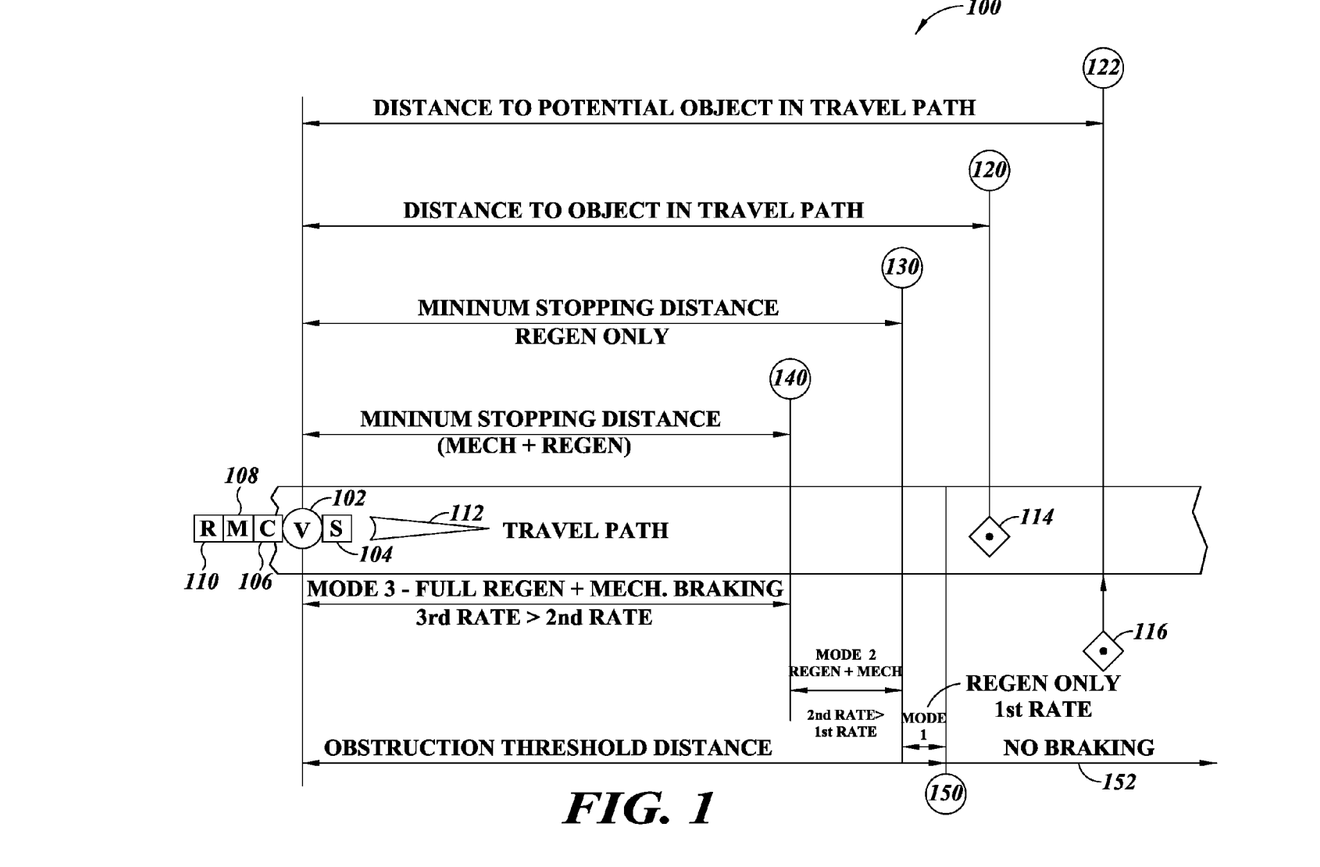
FIG. 1 is a schematic diagram of an example collision avoidance system for an electrically powered vehicle, according to an illustrated embodiment.

FIG. 1 shows an illustrative collision avoidance system 100 useful for implementation in electrically powered vehicles 102, according to an embodiment. The electrically powered vehicle 102 includes any number of sensors 104, at least one electrically powered vehicle controller 106, a mechanical braking system 108, and a regenerative braking system 110. The electrically powered vehicle 102 travels along a travel path 112. One or more objects 114 may lie within the travel path 112 of the electrically powered vehicle 102. The one or more objects 114 can include animate objects (persons, animals, etc.) or inanimate objects (other vehicles, barricades, road hazards, etc.). Additionally, one or more objects 116 may be imminently present in the travel path 112 of the electrically powered vehicle 102. Such imminently present objects 116 can include animate objects (persons or animals traveling toward the travel path 112) or inanimate objects (other vehicles traveling toward the travel path 112).

Each of the number of sensors 104 generate one or more signals containing data indicative of one or more environmental, road, or vehicle conditions. Non-limiting examples of environmental sensors 104 can include: temperature sensors, humidity sensors, precipitation detecting sensors, snow detecting sensors, fog detecting sensors, and the like. Non-limiting examples of road sensors 104 can include: road surface detecting sensors, road wetness detecting sensors, snow detecting sensors, ice detecting sensors, road friction detecting sensors, road slope sensors, road pitch sensors, and the like. Non-limiting examples of vehicle sensors can include: vehicle load sensors, mechanical braking system sensors, vehicle load distribution sensors, vehicle battery charge level sensors, vehicle battery temperature sensors, vehicle battery condition sensors, and the like. The electrically powered vehicle controller 106 is communicably coupled to each of the number of sensors and receives signals that include sensor data on a continuous, intermittent, or periodic basis.

At least one of the sensors 104 is an object detection sensor 104 that generates one or more signals indicative of the presence of one or more objects 114 in the travel path 112 of the electrically powered vehicle 102 and/or the imminent presence of one or more objects 116 in the travel path 112 of the electrically powered vehicle 102. In some instances, the at least one sensor 104 can provide an output signal containing data indicative of the distance 120 to one or more objects 114 in the travel path 112 of the electrically powered vehicle 102 and/or the distance 122 to one or more imminently present objects 116 that are about to enter into the travel path 112 of the electrically powered vehicle 102. In some implementations, the electrically-powered vehicle controller 106 receives the data from the object detection sensors 104 and, in some implementations, determines a distance 120 between the electrically powered vehicle 102 and the one or more objects 114 in the travel path of the electrically powered vehicle 102 and/or a distance 122 between the electrically powered vehicle 102 and the one or more imminently present objects 116 that are about to enter into the travel path of the electrically powered vehicle 102.

At times, at least one or more sensors external to the electrically powered vehicle 102 (not shown) may be used by the electrically powered vehicle controller 106 to determine the distance 120 to one or more objects 114 in the travel path 112 of the electrically powered vehicle 102 and/or the distance 122 to one or more imminently present objects 116 that are about to enter into the travel path 112 of the electrically powered vehicle 102. For example, one or more roadside beacons may transmit a signal containing data indicative of a distance 120 to one or more objects 114 in the travel path 112 of the electrically powered vehicle 102 to the electrically powered vehicle controller 106. In another example, one or more signals that include data indicative of traffic and/or similar road hazards, obstructions, or conditions as provided by Google® Maps and similar online services may be received by the electrically powered vehicle 102 for use by an electrically powered vehicle controller 106.

The electrically powered vehicle controller 106 determines a minimum regenerative stopping distance 130 using only the regenerative braking system 110 carried by the electrically powered vehicle 102. In some implementations, the electrically powered vehicle controller 106 uses one or more signals provided by the sensors 104 to determine the minimum regenerative stopping distance 130. For example, the electrically powered vehicle controller 106 may use signals provided by sensors 104 such as one or more environmental sensors, one or more road sensors, and/or one or more vehicle sensors. In at least some implementations, at a minimum, the electrically powered vehicle controller 106 can determine the minimum regenerative stopping distance 130 based on one or more vehicle battery charge level sensors, vehicle battery temperature sensors, and/or vehicle battery condition sensors. The electrically powered vehicle controller 106 determines the minimum regenerative stopping distance 130 on a continuous, intermittent, or periodic basis. Advantageously, the minimum regenerative stopping distance 130 determined by the electrically powered vehicle controller 106 reflects current environmental, road, and vehicle conditions.

The electrically powered vehicle controller 106 determines a minimum composite stopping distance 140 using both the regenerative braking system 110 and the mechanical braking system 108 carried by the electrically powered vehicle 102. In some implementations, the electrically powered vehicle controller 106 uses one or more signals provided by the sensors 104 to determine the minimum composite stopping distance 140. For example, the electrically powered vehicle controller 106 may use signals provided by sensors 104 such as one or more environmental sensors, one or more road sensors, and/or one or more vehicle sensors in determining the minimum composite stopping distance 140. In at least some implementations, at a minimum, the electrically powered vehicle controller 106 can determine the minimum composite stopping distance 140 based on one or more vehicle battery charge level sensors, vehicle battery temperature sensors, and/or vehicle battery condition sensors. The electrically powered vehicle controller 106 determines the minimum composite stopping distance 140 on a continuous, intermittent, or periodic basis. Advantageously, the minimum composite stopping distance 140 determined by the electrically powered vehicle controller 106 reflects current environmental, road, and vehicle conditions.

The electrically powered vehicle controller 106 determines an obstruction threshold distance 150 beyond which (as indicated by reference number 152) one or more objects 114 in the travel path 112 of the electrically powered vehicle 102 or one or more imminently present objects 116 that are about to enter into the travel path 112 of the electrically powered vehicle 102 will not cause the electrically powered vehicle controller 106 to undertake an autonomous braking action. In some implementations, the electrically powered vehicle controller 106 determines the obstruction threshold distance 150 based at least in part on the determined minimum regenerative stopping distance 130. For example, the obstruction threshold distance can be greater than or equal to about 105%; greater than or equal to about 110%; greater than or equal to about 115%; greater than or equal to about 120%; greater than or equal to about 125%; or greater than or equal to about 130% of the minimum regenerative stopping distance 130. The electrically powered vehicle controller 106 determines the obstruction threshold distance 150 on a continuous, intermittent, or periodic basis. Advantageously, the obstruction threshold distance 150 determined by the electrically powered vehicle controller 106 reflects current environmental, road, and vehicle conditions.

For one or more objects 114 in the travel path 112 and/or one or more imminently present objects 116 that are about to enter into the travel path 112 at a distance from the electrically powered vehicle 102 that falls between the minimum regenerative stopping distance 130 and the obstruction threshold distance 150, the electrically powered vehicle controller 106 autonomously enters a first braking mode in which only the regenerative braking system 110 is used to slow the electrically powered vehicle 102 at or above a first rate (e.g., at or above a defined first rate of deceleration) so that the electrically powered vehicle 102 is slowed or halted prior to impacting the one or more objects 114 in the travel path 112 of the electrically powered vehicle 102 and/or the one or more imminently present objects 116 that are about to enter into the travel path 112 of the electrically powered vehicle 102. In at least some implementations, the electrically powered vehicle controller 106 provides the vehicle operator with a human perceptible indication (e.g., lamp, sound, or similar) prior to entering the first braking mode.

For one or more objects 114 in the travel path 112 and/or one or more imminently present objects 116 that are about to enter into the travel path 112 at a distance that is less than the minimum regenerative stopping distance 130, the electrically powered vehicle controller 106 autonomously enters a second braking mode in which both the mechanical braking system 108 and the regenerative braking system 110 are used to slow the electrically powered vehicle 102 at or above a second rate (e.g., at or above a defined second rate of deceleration), where the second rate is greater (i.e., provides greater stopping power and/or reduced stopping distance) than the first rate. In some instances, the second braking mode slows the velocity of or completely halts the electrically powered vehicle 102 prior to impacting or contacting the one or more objects 114 in the travel path 112 and/or the one or more imminently present objects 116. In at least some implementations, the electrically powered vehicle controller 106 provides the vehicle operator with a human perceptible indication (e.g., lamp, sound, or similar) prior to entering the second braking mode.

In the second braking mode, the electrically powered vehicle controller 106 determines a level of mechanical braking and a level of regenerative braking needed to achieve the second rate of deceleration. At times, the electrically powered vehicle controller 106 determines the maximum level of regenerative braking capable of providing the second braking mode, thereby maximizing the energy recovery.

At times, for one or more objects 114 in the travel path 112 and/or one or more imminently present objects 116 that are about to enter into the travel path 112 at a distance that is less than the minimum composite stopping distance 140, the electrically powered vehicle controller 106 may autonomously enter a third braking mode in which both the mechanical braking system 108 and the regenerative braking system 110 are used at a maximum level to slow the electrically powered vehicle 102 at or above a third rate (e.g., at or above a defined third rate of deceleration) where the third rate is greater than the second rate. At times, the third rate is sufficiently high that the vehicle operator experiences some discomfort in the deceleration (i.e., the third rate of deceleration represents an emergency condition or "panic stop") in order to avoid or reduce the impact with one or more objects 114 in the travel path 112 of the electrically powered vehicle 102 or one or more imminently present objects 116 that are about to enter into the travel path 112 of the electrically powered vehicle 102. In at least some implementations, the electrically powered vehicle controller 106 provides the vehicle operator with a distinct human perceptible indication (e.g., a "hang on" lamp, sound, or similar) prior to entering the third braking mode.

Figure 2:
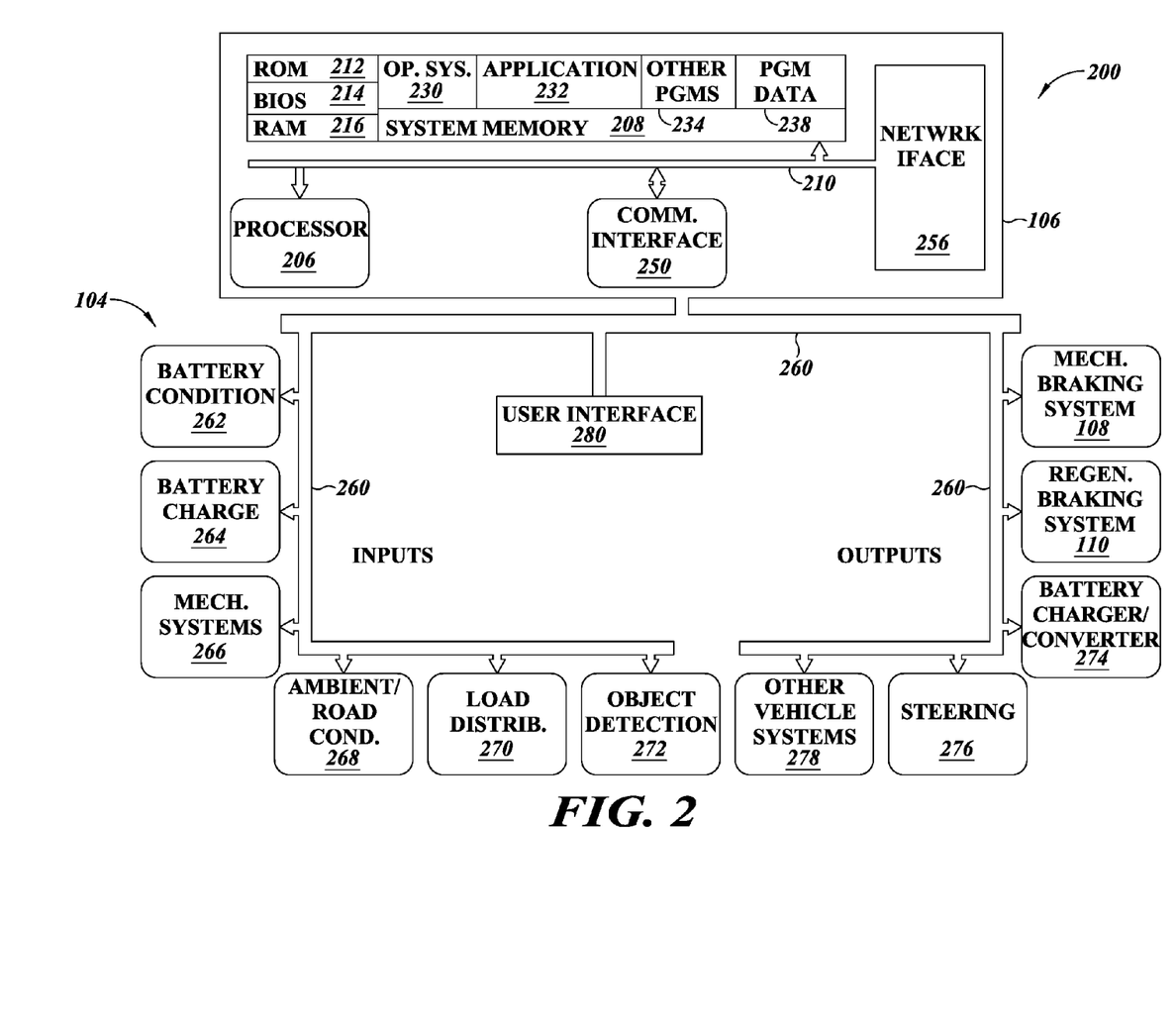
FIG. 2 is a schematic diagram showing an example collision avoidance system for an electrically powered vehicle, according to one illustrated embodiment.

FIG. 2 shows an illustrative electrically powered vehicle control system 200 that includes at least one electrically powered vehicle controller 106 communicably coupled to a number of electrically powered vehicle inputs and a number of electrically powered vehicle outputs, according to an embodiment. Using data obtained from signals provided by a number of sensor inputs 104, the electrically powered vehicle controller 106 continuously, intermittently, or periodically determines values indicative of the minimum regenerative stopping distance 130, the minimum composite stopping distance 140, and the obstruction threshold distance 150. Based on the determined minimum regenerative stopping distance 130, minimum composite stopping distance 140, and the obstruction threshold distance 150, the electrically powered vehicle controller 106 autonomously generates one or more outputs that are communicated via one or more communications links 260 (e.g., vehicular busses such as a CAN bus) to one or more vehicular systems such as the mechanical braking system 108 and/or the regenerative braking system 110.

The electrically powered vehicle control system 200 includes a number of sensors 104 that provide input signals including data or information on electrically powered vehicle systems, ambient conditions, and road conditions to the electrically powered vehicle controller 106.

The sensors 104 can include one or more battery condition sensors 262 that provide the electrically powered vehicle controller 106 with information indicative of battery condition. The battery condition sensors 262 include sensors that provide the electrically powered vehicle controller 106 with information relevant to some or all of: the battery's ability to accept a charge; the minimum and maximum charging current flow to the battery; the minimum and maximum charging voltage to the battery; the number of charging cycles on the battery; the number and/or location of failed storage cells within the battery; and the like. Such battery condition sensors can include temperature sensors, voltage sensors, current sensors, timers, counters, and similar devices. For example, the input from a battery temperature sensor may be used by the electrically powered vehicle controller 106 to limit the energy flow generated by regenerative braking as a function of temperature, such as reducing or limiting regenerative current flow to the battery at low temperatures and increasing regenerative current flow to the battery at high temperatures. Since the current flow generated by regenerative braking is a function of the level of deceleration provided by the regenerative braking system 110, such may, for example, cause the electrically powered vehicle controller 106 to increase minimum regenerative stopping distance 130 at lower temperatures.

The sensors 104 can include one or more battery charge sensors 264 that provide the electrically powered vehicle controller 106 with information indicative of the charge level in each battery carried by the electrically powered vehicle. Batteries having higher charge levels may be limited in the ability to accept current generated through regenerative braking. On electrically powered vehicles 102 powered by more than one battery, the charge levels in the batteries may be imbalanced, in which case the electrically powered vehicle controller 106 may provide regenerative braking current at a higher rate to a first battery than to a second battery. Thus, information about the battery charge level can be used by the controller to limit the flow of regenerative braking current to the battery or batteries of the electrically powered vehicle. Since the current flow generated by regenerative braking is a function of the level of deceleration provided by the regenerative braking system 110, such may, for example, cause the electrically powered vehicle controller 106 to increase minimum regenerative stopping distance 130 when the batteries carried by the electrically powered vehicle are at higher charge levels.

The sensors 104 can include one or more vehicular system performance sensors 266 that provide the electrically powered vehicle controller 106 with information indicative of the ability of the mechanical and/or electrical systems to slow the electrically powered vehicle. Examples of mechanical braking sensors 266 that provide the electrically powered vehicle controller 106 with information related to mechanical braking system performance, include sensors capable of detecting brake fluid levels, brake pad wear, and similar. Examples of other mechanical braking sensors that provide the electrically powered vehicle controller 106 with information relevant to the stopping capabilities of the electrically powered vehicle include tire wear sensors (worn tires require longer stopping distances), tire pressure sensors, and similar. Worn mechanical components can increase the minimum composite stopping distance 140 by providing reduced levels of mechanical braking.

An example of an electrical system sensor may include one or more sensors that provide information on the AC/DC converter(s) carried by the electrically powered vehicle. Regenerative braking generates alternating current which must be converted to direct current for storage in the electrically powered vehicle battery. Conversely, direct current provided by the batteries of an electrically powered vehicle must generally be converted to alternating current to drive the electrically powered vehicle. Thus the AC/DC converter may generate heat, particularly during periods of high load driving. The heat generated in the AC/DC converter may limit the converter's capacity to convert regenerative braking (AC) current to DC current. Since the current flow generated by regenerative braking is a function of the level of deceleration provided by the regenerative braking system 110, such may, for example, cause the electrically powered vehicle controller 106 to increase minimum regenerative stopping distance 130 when the AC/DC converter carried by the electrically powered vehicle is in a state (e.g., high temperature) that limits the capacity of the AC/DC converter.

The sensors 104 can include one or more ambient condition and/or road condition sensors 268 that provide the electrically powered vehicle controller 106 with information indicative of ambient and/or road conditions that impact the ability of the mechanical braking system 108 and the regenerative braking systems 110 to slow the electrically powered vehicle. Examples of ambient condition sensors 268 that provide the electrically powered vehicle controller 106 with information related to determining minimum regenerative stopping distance 130 and/or minimum composite stopping distance 140 include: temperature sensors, humidity sensors, and precipitation sensors. Generally cold and/or wet conditions will increase stopping distances for at least the mechanical braking system 108 and may increase stopping distances for the regenerative braking system 110 as well. Thus, receiving information about cold or wet ambient conditions may cause the electrically powered vehicle controller 106 to autonomously determine an increased minimum composite stopping distance 140 and/or an increased minimum regenerative stopping distance 130.

Examples of road condition sensors 268 that provide the electrically powered vehicle controller 106 with information related to determining minimum regenerative stopping distance 130 and/or minimum composite stopping distance 140 include: road slope or pitch sensors, road surface sensors (e.g., sensors that provide an indication of an improved road, an unimproved road, loose gravel, and the like), ice detecting sensors, fluid detecting sensors, and the like. Generally any road conditions such as loose gravel, ice, standing water, oil or other fluids reduce the coefficient of friction between the tires of the electrically powered vehicle and the road surface. Such reduced coefficients of friction increase minimum regenerative stopping distance 130 and minimum composite stopping distance 140 for the electrically powered vehicle. Thus, the presence of poor road conditions and/or a downward sloping surface may, for example, cause the electrically powered vehicle controller 106 to autonomously determine an increased minimum regenerative stopping distance 130, an increased minimum composite stopping distance 140, and an increased obstruction threshold distance 150.

In some instances, external data may be used in conjunction with the ambient condition and/or road sensors 268. For example, a geolocation input corresponding to the location of the electrically powered vehicle 102 may be used to determine whether the road surface on the travel path 112 of the electrically powered vehicle will change. For example, if an improved (e.g., asphalt) road surface changes to an unimproved (e.g., loose gravel) road surface. In another example, if a change in road elevation or weather along the travel path 112 of the electrically powered vehicle is likely to affect the performance of the mechanical braking system 108 and/or the regenerative braking system 110. The electrically powered vehicle controller 106 can advantageously and autonomously determine minimum regenerative stopping distance 130, minimum composite stopping distance 140, and obstruction threshold distance 150 based at least in part on anticipated changes in road and/or ambient conditions based on the geolocation of the electrically powered vehicle 102 and the travel path 112 of the electrically powered vehicle.

The sensors 104 can include one or more load sensors 270 that provide the electrically powered vehicle controller 106 with information indicative of load and/or load distribution on the electrically powered vehicle that impact the ability of the mechanical braking system 108 and the regenerative braking systems 110 to slow the electrically powered vehicle. Examples of load sensors that provide the electrically powered vehicle controller 106 with information related to determining minimum regenerative stopping distance 130 and/or minimum composite stopping distance 140 include: load cells, strain gauges, and the like. Generally, heavier loads and/or loads that are biased towards the front or rear of the electrically powered vehicle increase the stopping distance for the mechanical braking system 108 and the regenerative braking system 110. Thus, a heavily loaded or awkwardly distributed load on the electrically powered vehicle may cause the electrically powered vehicle controller 106 to autonomously determine an increased minimum regenerative stopping distance 130, an increased minimum composite stopping distance 140, and/or an increased obstruction threshold distance 150.

The sensors 104 can include one or more object detection sensors 272 that provide the electrically powered vehicle controller 106 with information indicative of one or more objects 114 in the travel path 112 of the electrically powered vehicle and/or one or more imminent objects 116 in the travel path 112 of the electrically powered vehicle 102. Examples of object detection sensors 272 include visible wavelength cameras, far infrared cameras, infrared cameras, ultrasonic sensors, radar sensors, lidar sensors, and the like.

Outputs controlled, altered, or adjusted by the electrically powered vehicle controller 106 include the mechanical braking system 108, the regenerative braking system 110, the battery charger or AC/DC converter 274, the vehicle steering system 276, and other vehicular systems 278 such as the vehicle horn and/or the vehicle lights. The electrically powered vehicle controller 106 generates one or more control outputs that controls, alters, or adjusts the level of braking provided by the mechanical braking system 108 in response to detecting one or more objects 114 in the travel path 112 of the electrically powered vehicle 102 and/or one or more imminent objects 116 in the travel path 112 of the electrically powered vehicle. The electrically powered vehicle controller 106 generates one or more control outputs that controls, alters, or adjusts the level of braking provided by the regenerative braking system 110 in response to detecting one or more objects 114 in the travel path 112 of the electrically powered vehicle and/or one or more imminent objects 116 in the travel path 112 of the electrically powered vehicle.

The electrically powered vehicle controller 106 can selectively control, alter, or adjust one or more parameters of the AC/DC converter 274 to increase or decrease the quantity of current entering or leaving the battery of the electrically powered vehicle. Controlling, altering, or adjusting the current flow through the AC/DC converter can vary the level of braking force applied by the mechanical braking system 108, regenerative braking system 110 and may also impact the minimum regenerative stopping distance 130 and/or the obstruction threshold distance 150. For example, in some instances, the momentum of the electrically powered vehicle 102 can cause the rotor in the motor carried by the electrically powered vehicle 102 to rotate through a fixed or variable magnetic field, thereby slowing the electrically powered vehicle 102 and returning electrical energy to the batteries powering the vehicle.

The electrically powered vehicle controller 106 can selectively control, alter, or adjust one or more parameters of the steering system 276 of the electrically powered vehicle to alter the travel path 112 of the electrically powered vehicle 102. For example, using a "steer by wire" or similar system, the electrically powered vehicle controller 106 can cause a change in the direction of the travel path of the vehicle to avoid an object 116. Such alterations in travel path 112 may be performed to reduce or avoid impact with one or more objects 114 in the travel path 112 of the electrically powered vehicle and/or one or more imminent objects 116 in the travel path 112 of the electrically powered vehicle.

The electrically powered vehicle controller 106 can selectively control, alter, or adjust one or more parameters of other vehicular systems 278. For example, if impact with one or more objects 114 in the travel path 112 of the electrically powered vehicle or one or more imminent objects 116 in the travel path 112 of the electrically powered vehicle is unavoidable, the electrically powered vehicle controller 106 may sound the vehicle horn or flash the vehicle lights to provide an alert.

The electrically powered vehicle controller 106 is communicably coupled to a user interface 280 via one or more communications links 260. The user interface 280 functions as both an input device and an output device. For example, the user interface 280 functions as an output device via which the electrically powered vehicle controller 106 provides a human perceptible alert (e.g., a visual alert, an audible alert, or combinations thereof) to the vehicle occupants prior to entering the first braking mode, second braking mode, and the optional third braking mode.

The electrically powered vehicle controller 106 may take the form of any number of interconnected logic circuits and/or logic devices capable of executing machine executable instructions or one or more commercially available processors or controllers (e.g., ARM Cortext-A8, ARM Cortext-A9, Snapdragon 600, Snapdragon 800, NVidia Tegra 4, NVidia Tegra 4i, Intel Atom Z2580, Samsung Exynos 5 Octa, Apple A7, Motorola X8). The electrically powered vehicle controller 106 includes one or more logic circuits or devices such as one or more processors 206, a system memory 208 and a system bus 210 that couples various system components including the system memory 208 to the processor 206. The electrically powered vehicle controller 106 will at times be referred to in the singular herein, but this is not intended to limit the embodiments to a single system, since in certain embodiments, there will be more than one back-end system 130 or other networked computing device involved.

Although not required, some portion of the embodiments will be described in the general context of computer-executable instructions or logic and/or data, such as program application modules, objects, or macros being executed by the electrically powered vehicle controller 106. Those skilled in the relevant art will appreciate that the illustrated embodiments as well as other embodiments can be practiced with other computer system or processor-based device configurations, including handheld devices, for instance Web enabled cellular phones or PDAs, multiprocessor systems, and microprocessor-based or programmable consumer electronics. The embodiments can be practiced in distributed computing environments where tasks or modules are performed by remote processing devices, which are linked to the electrically powered vehicle controller 106 through a communications network.

The system memory 208 includes read-only memory ("ROM") 212 and random access memory ("RAM") 216. A basic input/output system ("BIOS") 214, which may be incorporated into at least a portion of the ROM 212, contains basic routines that help transfer information between elements within the back-end system 130, such as during start-up. Some embodiments may employ separate buses for data, instructions and power.

The system bus 210 can employ any known bus structures or architectures.

Program modules can be stored in the system memory 208, such as an operating system 230, one or more application programs 232, other programs or modules 234, and program data 238. The application program(s) 232 may include electrically powered vehicle collision avoidance functionality as described herein. For example, applications programs 232 may include one or more programs to determine the minimum regenerative stopping distance 130, one or more programs to determine the minimum composite stopping distance 140, and one or more programs to determine the obstruction threshold distance 150. Some or all of such programs may determine the minimum regenerative stopping distance 130, minimum composite stopping distance 140, and obstruction threshold distance 150 based in whole or in part on data provided by one or more sensors 104 as described in detail above. Such sensors 104 provide data indicative of factors that affect the ability of the mechanical braking system 108 and the regenerative braking system 110 to safely and comfortably halt the electrically powered vehicle in response to detecting one or more objects 114 in the travel path 112 of the electrically powered vehicle 102 and/or one or more imminent objects 116 in the travel path 112 of the electrically powered vehicle.

The application program(s) 232 may include one or more programs to determine one or more of the minimum regenerative stopping distance 130, minimum composite stopping distance 140, and/or obstruction threshold distance 150 based on data provided by one or more external systems such as a geolocation system. Such advantageously provides the electrically powered vehicle controller 106 with the ability to predictively determine minimum regenerative stopping distance 130, minimum composite stopping distance 140, and obstruction threshold distance 150 based on known or anticipated road or environmental conditions that lie along the travel path 112 of the electrically powered vehicle.

The electrically powered vehicle controller 106 includes a communications interface 250. Information in the form of signals provided by sensors 104 is provided to the electrically powered vehicle controller 106 via the communications interface 250 and the communications link 260. Control output signals generated by the electrically powered vehicle controller 106 are communicated to various electrically powered vehicle systems and devices via the communications interface 250 and the communications link 260.

The electrically powered vehicle controller 106 also includes an internal or external network port or interface 256. The network interface can include a wired or wireless interface via which the electrically powered vehicle controller 106 can bidirectionally exchange programs, data, and information with one or more external devices. For example, electrically powered vehicle controller 106 software and/or firmware updates may be wirelessly delivered via network interface 256. Such wireless delivery may be accomplished via a cellular (e.g., GSM, CDMA, 3G, 4G, LTE, and similar) connection, a BLUETOOTH® connection, a WiFi (IEEE 802.11, any version) connection, a near field communication (NFC) connection, or the like.

For convenience, the processor 206, system memory 208, network port 256 and devices 246, 250 are illustrated as communicatively coupled to each other via the system bus 210, thereby providing connectivity between the above-described components. In alternative embodiments, the above-described components may be communicatively coupled in a different manner than illustrated in FIG. 2. For example, one or more of the above-described components may be directly coupled to other components, or may be coupled to each other, via intermediary components (not shown). In some embodiments, system bus 210 is omitted and the components are coupled directly to each other using suitable connections.

Figure 3:
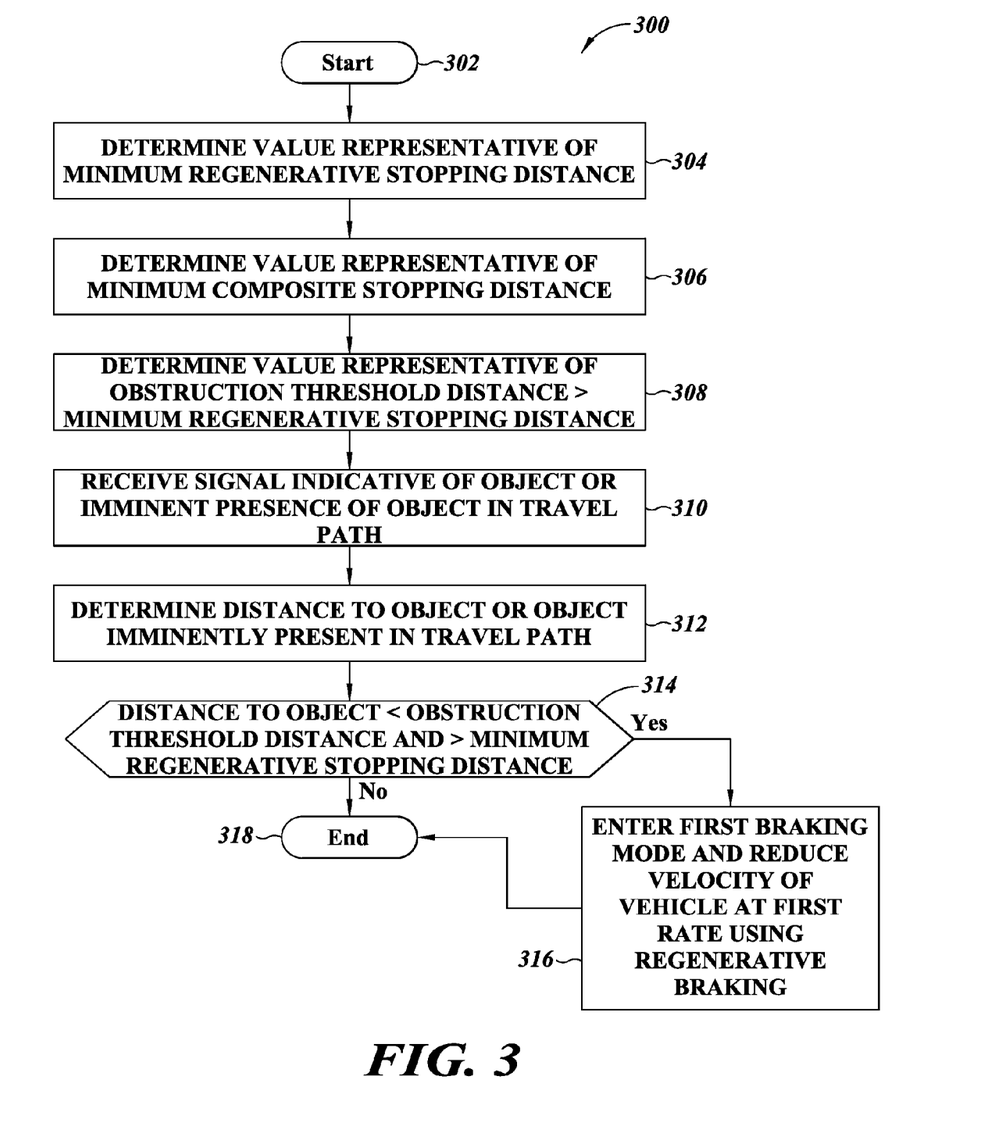
FIG. 3 is a high level logic flow diagram of an example collision avoidance method for an electrically powered vehicle, according to an illustrated embodiment.

FIG. 3 shows a high level flow diagram 300 of an illustrative electrically powered vehicle 102 collision avoidance method, according to an embodiment. The electrically powered vehicle controller 106 implements a collision avoidance method that maximizes the use of regenerative braking in safely and comfortably slowing and/or stopping the electrically powered vehicle 102 upon detecting one or more objects 114 in the travel path 112 of the electrically powered vehicle 102 and/or one or more imminent objects 116 in the travel path 112 of the electrically powered vehicle 102. The collision avoidance method 300 commences at 302.

At 304, the electrically powered vehicle controller 106 determines a value representative of the minimum regenerative stopping distance 130 of the electrically powered vehicle 102. The minimum regenerative stopping distance 130 is the least distance required to stop the electrically powered vehicle 102 using only the regenerative braking system 110. The minimum regenerative stopping distance 130 may be affected or impacted by vehicular, ambient, and road factors. The electrically powered vehicle controller 106 continuously, intermittently, or periodically determines the minimum regenerative stopping distance 130 based on data received from a number of sensors 104, including one or more object detection sensors 272 and some or all of the following: battery condition sensors 262, battery charge sensors 264, vehicle mechanical system condition sensors 266, ambient condition and road condition sensors 268, load and/or load distribution sensors 270.

At 306, the electrically powered vehicle controller 106 determines a value representative of the minimum composite stopping distance 140 of the electrically powered vehicle 102. The minimum composite stopping distance 140 is the least distance required to stop the electrically powered vehicle 102 using a combination of the mechanical braking system 108 and the regenerative braking system 110. The minimum composite stopping distance 140 may be affected or impacted by vehicular, ambient, and road factors. The electrically powered vehicle controller 106 continuously, intermittently, or periodically determines the minimum composite stopping distance 140 based on data received from a number of sensors 104, including one or more object detection sensors 272 and some or all of the following: battery condition sensors 262, battery charge sensors 264, vehicle mechanical system condition sensors 266, ambient condition and road condition sensors 268, load and/or load distribution sensors 270.

At 308, the electrically powered vehicle controller 106 determines an obstruction threshold distance 150. The obstruction threshold distance 150 is the distance at which the electrically powered vehicle controller 106 will begin autonomous braking action. At times, the electrically powered vehicle controller 106 does not autonomously respond to objects in the vehicular travel path 112 beyond the obstruction threshold distance 150, but does autonomously respond to objects in the vehicular travel path 112 within the obstruction threshold distance 150. Generally, the obstruction threshold distance 150 will be at least equal to or greater than the minimum regenerative stopping distance 130 determined at 304.

At 310, the electrically powered vehicle controller 106 receives one or more signals from an object detection sensor 272 that includes information indicative of one or more objects 114 in the travel path 112 that fall within the obstruction threshold distance 150 and/or one or more imminent objects 116 in the travel path 112 that fall within the obstruction threshold distance 150.

At 312, the electrically powered vehicle controller 106 determines a value representative of a distance between the electrically powered vehicle 102 and the detected one or more objects 114 in the travel path 112 of the electrically powered vehicle 102 and/or the detected one or more imminent objects 116 in the travel path 112 of the electrically powered vehicle 102.

At 314, the electrically powered vehicle controller 106 determines whether the distance to the one or more objects 114 and/or the one or more imminent objects 116 falls between the minimum regenerative stopping distance 130 and the obstruction threshold distance 150.

At 316, responsive to determining the distance to the one or more objects 114 and/or the one or more imminent objects 116 falls between the minimum regenerative stopping distance 130 and the obstruction threshold distance 150, the electrically powered vehicle controller 106 enters a first braking mode in which the regenerative braking system 110 is used to slow or stop the vehicle prior to a collision with the object 114 or the imminently present object 116. In the first braking mode, the electrically powered vehicle controller 106 slows the electrically powered vehicle 102 at a first rate of deceleration that safely and comfortably slows and/or halts the electrically powered vehicle 102. The method 300 concludes at 318.

Figure 4:
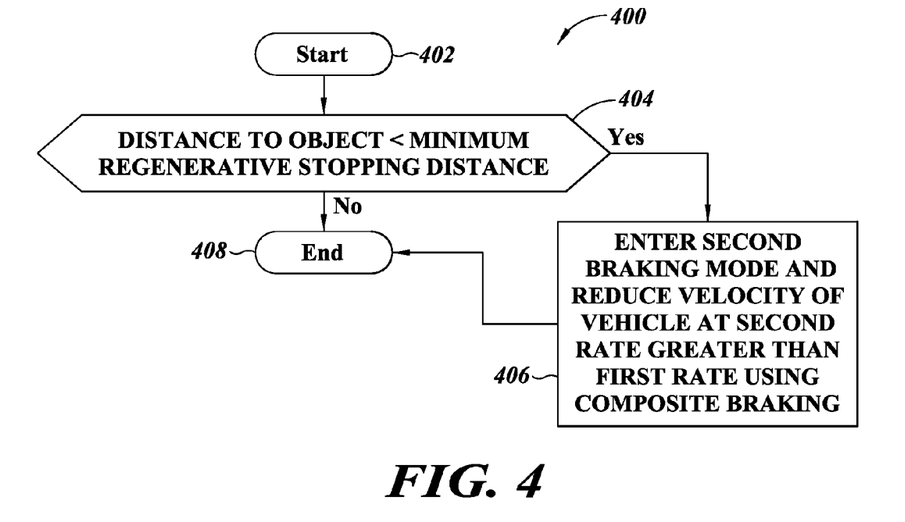
FIG. 4 is a high level logic flow diagram of an example collision avoidance method for an electrically powered vehicle, according to an illustrated embodiment.

FIG. 4 shows a high-level flow diagram of an illustrative electrically powered vehicle 102 collision avoidance method 400 that autonomously enters a second, composite, braking mode using both the mechanical braking system 108 and the regenerative braking system 110 to slow and/or halt the electrically powered vehicle 102, according to an embodiment. At times, objects 114 and/or imminently present objects 116 may not be detected at a distance exceeding the minimum regenerative stopping distance 130. Such may occur for example when the object 114 and/or imminently present object lies around a curve or over the crest of a hill and is therefore lies outside of the detection range or detection field of the object detection sensors 272. In such instances, the electrically powered vehicle controller 106 autonomously places the electrically powered vehicle 102 in a composite braking mode in which a combination of mechanical and composite braking is used to safely and comfortably slow the electrically powered vehicle 102. The method 400 commences at 402.

At 404, the electrically powered vehicle controller 106 determines whether the distance to the one or more objects 114 and/or the one or more imminent objects 116 is less than the minimum regenerative stopping distance 130.

At 406, responsive to determining the distance to the one or more objects 114 and/or the one or more imminent objects 116 is less than the minimum regenerative stopping distance 130, the electrically powered vehicle controller 106 places the electrically powered vehicle 102 in a second, composite, braking mode in which the mechanical braking system 108 and the regenerative braking system 110 are used to slow or stop the vehicle prior to a collision with the object 114 or the imminently present object 116. In the second braking mode, the electrically powered vehicle controller 106 slows the electrically powered vehicle 102 at a second rate of deceleration that safely and comfortably slows and/or halts the electrically powered vehicle 102. The second rate of deceleration is greater than the first rate of deceleration using only the regenerative braking system 110.

In the second braking mode, the electrically powered vehicle controller 106 advantageously maximizes the level of regenerative braking and determines the level of mechanical braking required to safely and comfortably slow or stop the electrically powered vehicle 102. Such mechanical braking may take the form of one or more hydraulically actuated braking systems or one or more pneumatically actuated braking systems. The mechanical braking system operates by causing two friction producing components (e.g., brake pads and rotor and/or brake pads and drum) to contact, with the pressure exerted by the brake pads determining the stopping distance. In at least some instances, the mechanical braking system may include one or more anti-lock braking (ABS) braking systems. Such regenerative braking systems can include any current or future regenerative braking technology. For example, reversing the direction of current flow through the AC/DC converter carried by the electrically powered vehicle 102 (e.g., accelerative current flow from battery to motor reverses to decelerative current flow from motor to battery). The method 400 concludes at 408.

Figure 5:
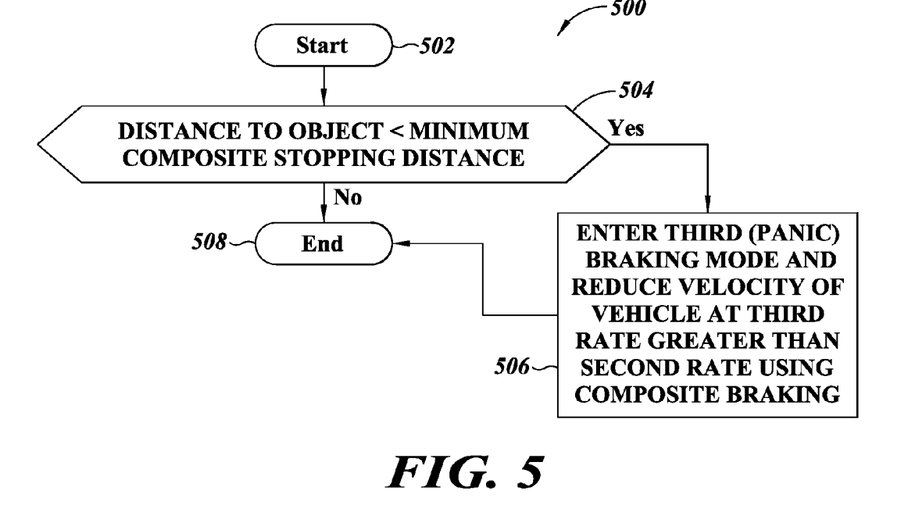
FIG. 5 is a high level logic flow diagram of an example collision avoidance method for an electrically powered vehicle, according to an illustrated embodiment.

FIG. 5 shows a high-level flow diagram of an illustrative electrically powered vehicle 102 collision avoidance method 500 that autonomously enters a third, composite, braking mode using both the mechanical braking system 108 and the regenerative braking system 110 to slow and/or halt the electrically powered vehicle 102, according to an embodiment. At times, objects 114 and/or imminently present objects 116 may not be detected at a distance exceeding the minimum composite stopping distance 140. Such may occur for example when the object 114 and/or imminently present object lies around a curve or over the crest of a hill and is therefore lies outside of the detection range or detection field of the object detection sensors 272. In such instances, the electrically powered vehicle controller 106 autonomously places the electrically powered vehicle 102 in a third, composite, braking mode in which a combination of mechanical and composite braking is used to slow the electrically powered vehicle 102 at a maximum rate of deceleration (i.e., a "panic stop"). The method 500 commences at 502.

At 504, the electrically powered vehicle controller 106 determines whether the distance to the one or more objects 114 and/or the one or more imminent objects 116 is less than the minimum composite stopping distance 140.

At 506, responsive to determining the distance to the one or more objects 114 and/or the one or more imminent objects 116 is less than the minimum composite stopping distance 140, the electrically powered vehicle controller 106 places the electrically powered vehicle 102 in a third, composite, braking mode in which the mechanical braking system 108 and the regenerative braking system 110 are used to slow or stop the vehicle at a third, maximum, rate of deceleration. In the third braking mode, the electrically powered vehicle controller 106 slows the electrically powered vehicle 102 at a third rate of deceleration that slows and/or halts the electrically powered vehicle 102 in the shortest possible distance. The third rate of deceleration is greater than the second rate of deceleration. The method 500 concludes at 508.

The various methods described herein may include additional acts, omit some acts, and/or may perform the acts in a different order than set out in the various flow diagrams.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via one or more microcontrollers. However, those skilled in the art will recognize that the embodiments disclosed herein, in whole or in part, can be equivalently implemented in standard integrated circuits (e.g., Application Specific Integrated Circuits or ASICs), as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and/or firmware would be well within the skill of one of ordinary skill in the art in light of the teachings of this disclosure.

When logic is implemented as software and stored in memory, logic or information can be stored on any non-transitory computer-readable medium for use by or in connection with any processor-related system or method. In the context of this disclosure, a memory is a nontransitory computer- or processor-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any physical element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to: U.S. provisional patent application Ser. No. 61/601,949, entitled "APPARATUS, METHOD AND ARTICLE FOR PROVIDING LOCATIONS OF POWER STORAGE DEVICE COLLECTION, CHARGING AND DISTRIBUTION MACHINES" and filed Feb. 22, 2012; U.S. provisional patent application Ser. No. 61/511,900, entitled "APPARATUS, METHOD AND ARTICLE FOR COLLECTION, CHARGING AND DISTRIBUTING POWER STORAGE DEVICES, SUCH AS BATTERIES" and filed Jul. 26, 2011; U.S. provisional patent application Ser. No. 61/511,887, entitled "THERMAL MANAGEMENT OF COMPONENTS IN ELECTRIC MOTOR DRIVE VEHICLES" and filed Jul. 26, 2011 and U.S. provisional patent application Ser. No. 61/511,880, entitled "DYNAMICALLY LIMITING VEHICLE OPERATION FOR BEST EFFORT ECONOMY" and filed Jul. 26, 2011; are incorporated herein by reference, in their entirety. Aspects of the embodiments can be modified, if necessary, to employ systems, circuits and concepts of the various patents, applications and publications to provide yet further embodiments.

While generally discussed in the environment and context of collection and distribution of portable electrical energy storage devices for use with personal transportation vehicle such as all-electric scooters and/or motorbikes, the teachings herein can be applied in a wide variety of other environments, including other vehicular as well as non-vehicular environments.

The above description of illustrated embodiments, including what is described in the Abstract of the Disclosure, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A collision avoidance system for use with an electrically powered vehicle, the collision avoidance system comprising:
   a number of sensors, each of the number of sensors which, in operation, provide signals to a vehicle controller;
   at least one controller, communicably coupled to the number of sensors, that, in operation, receives signals from each of the number of sensors;
   a nontransitory storage medium that includes controller-executable instructions, that when executed by the at least one controller, cause the at least one controller to:
      determine a value representative of a minimum regenerative stopping distance achievable using only a regenerative braking system;
      determine a value representative of a minimum composite stopping distance achievable using a combination of a mechanical braking system and the regenerative braking system;
      determine a value representative of an obstruction threshold distance that is equal to or greater than the determined minimum regenerative stopping distance;
      responsive to receipt of a signal that includes data indicative of at least one object in a travel path of the electrically powered vehicle or the imminent entry of the at least one object into the travel path of the electrically powered vehicle from one or more of the number of sensors, determine a distance to the at least one object;
      responsive to a determination that the distance to the at least one object is less than the determined obstruction threshold distance and greater than the determined minimum regenerative stopping distance, autonomously enter a first braking mode in which the electrically powered vehicle is slowed at a first rate of deceleration using only the regenerative braking system.

2. The collision avoidance system of claim 1 wherein the instructions further cause the at least one controller to:
   prior to autonomous entry of the electrically powered vehicle into the first braking mode, generate a first human-perceptible output indicative of the first braking mode.

3. The collision avoidance system of claim 1 wherein the controller determines the minimum regenerative stopping distance and the minimum composite stopping distance based, at least hi part, on data supplied by one or more sensors or systems external to the electrically powered vehicle.

4. The collision avoidance system of claim 1 wherein the instructions further cause the at least one controller to:
responsive to a determination that the distance to the at least one object is less than the determined minimum regenerative stopping distance, autonomously determine a level of regenerative braking to apply and autonomously determine a level of mechanical braking to apply that stops the electrically powered vehicle prior to contact with the at least one object and maximizes the level of regenerative braking; and
autonomously enter a second braking mode in which the electrically powered vehicle slows at a second rate of deceleration that is greater than the first rate of deceleration by applying the regenerative braking system at the determined level of regenerative braking and applying the mechanical braking system at the determined level of mechanical braking.

5. The collision avoidance system of claim 4 wherein the instructions further cause the at least one controller to:
prior to autonomous entry of the electrically powered vehicle into the second braking mode, provide a second human-perceptible output indicative of the second braking mode.

6. The collision avoidance system of claim 4 wherein the instructions further cause the at least one controller to:
responsive to a determination that the distance to the at least one object is less than the determined minimum composite stopping distance, autonomously adjust a vehicular horn systems.

7. The collision avoidance system of claim 1 wherein the number of sensors include an object detection sensor, an available battery charge sensor, and at least one of:
a battery state sensor; a battery temperature sensor; a battery current sensor; a mechanical braking system sensor; an ambient environmental condition sensor; a road condition sensor; a load sensor; one or more accelerometers; a steering position sensor; a load distribution sensor; or a suspension travel sensor.

8. The collision avoidance system of claim 1 wherein the number of sensors include an object detection sensor and an available battery charge sensor; and
wherein the controller determines the minimum regenerative stopping distance and the minimum composite stopping distance based, at least in part, on the battery charge level.

9. The collision avoidance system of claim 1 wherein the instructions that cause the at least one controller to determine a value representative of a minimum regenerative stopping distance achievable using only the regenerative braking system, cause the at least one controller to:
determine a value representative of a minimum regenerative stopping distance achievable using the regenerative braking system on an intermittent, periodic, or continuous basis.

10. The collision avoidance system of claim 1 wherein the instructions that cause the at least one controller to determine a value representative of an obstruction threshold distance that is equal to or greater than the determined minimum regenerative stopping distance, cause the at least one controller to:
determine a value representative of an obstruction threshold distance that is greater than the determined minimum regenerative stopping distance on an intermittent, periodic, or continuous basis.

11. A collision avoidance method for use with an electrically powered vehicle, the method comprising:
determining, by at least one controller, a value representative of a minimum regenerative stopping distance achievable using only a regenerative braking system of the electrically powered vehicle;
determining, by the at least one controller, a value representative of a minimum composite stopping distance achievable using a combination of a mechanical braking system and the regenerative braking system of the electrically powered vehicle;
determining, by the at least one controller, a value representative of an obstruction threshold distance that is equal to or greater than the determined minimum regenerative stopping distance;
receiving, by the at least one controller, at least one signal including data indicative of at least one object in a travel path of the electrically powered vehicle or the imminent entry of the at least one object into the travel path of the electrically powered vehicle using one or more of a number of sensors communicably coupled to the at least one controller;
determining, by the at least one controller, a value representative of a distance between the electrically powered vehicle and the at least one object;
determining, by the at least one controller, whether the distance between the electrically powered vehicle and the at least one object is less than the determined obstruction threshold distance and greater than the determined minimum regenerative stopping distance; and
responsive to determining the distance between the electrically powered vehicle and the at least one object is less than the determined obstruction threshold distance and greater than the determined minimum regenerative stopping distance by the at least one controller, autonomously placing the electrically powered vehicle in a first braking mode in which a velocity of the electrically powered vehicle is reduced at a first rate of deceleration using only the regenerative braking system.

12. The collision avoidance method of claim 11, further comprising:
prior to placing the electrically powered vehicle in the first braking mode, generating, by the at least one controller on a vehicular user interface, a first human-perceptible output indicative of the first braking mode.

13. The collision avoidance method of claim 11 wherein determining, by the at least one controller, a value representative of a minimum composite stopping distance achievable using a combination of a mechanical braking system and the regenerative braking system of an electrically powered vehicle comprises:
determining, by the at least one controller, the minimum composite stopping distance using the mechanical braking system, the regenerative braking system, and data supplied by one or more sensors or systems external to the electrically powered vehicle.

14. The collision avoidance method of claim 11, further comprising:
responsive to a determination, by the at least one controller, that the distance to the at least one object is less than the determined minimum regenerative stopping distance, autonomously determining a level of regenerative braking to apply and a level of mechanical braking to apply to minimize the velocity of the electrically powered vehicle prior to contact with the at least one object and maximize the level of regenerative braking; and placing, by the at least one controller, the electrically powered vehicle in a second braking mode in which the velocity of the electrically powered vehicle is reduced at a second rate of deceleration that is greater than the first rate of deceleration by applying the regenerative braking system at the determined level of regenerative braking and applying the mechanical braking system at the determined level of mechanical braking.

15. The collision avoidance method of claim 14, further comprising:
prior to entering the second braking mode, generating, by the at least one controller on a vehicular user interface, a second human-perceptible output indicative of the second braking mode.

16. The collision avoidance method of claim 14, further comprising:
responsive to determining, by the at least one controller, that the distance to the at least one object is less than the determined minimum composite stopping distance autonomously adjusting, by the at least one controller, a vehicular light system.

17. The collision avoidance method of claim 11 wherein determining a value representative of a minimum composite stopping distance achievable using a combination of a mechanical braking system and the regenerative braking system of the electrically powered vehicle comprises:
determining, by the at least one controller, the value representative of a minimum composite stopping distance achievable using the combination of the mechanical braking system and the regenerative braking system of the electrically powered vehicle based at least in part on data provided by a battery charge level sensor.

18. The collision avoidance method of claim 11 wherein determining, by the at least one controller, a value representative of a minimum regenerative stopping distance achievable using a regenerative braking system of the electrically powered vehicle comprises:
determining, by the at least one controller, the value representative of the minimum regenerative stopping distance achievable using the on-board regenerative braking system of the electrically powered vehicle based at least in part on data provided by a battery charge level sensor.

19. The collision avoidance method of claim 11 wherein determining, by the at least one controller, a value representative of a minimum composite stopping distance achievable using a combination of a mechanical braking system and the regenerative braking system of the electrically powered vehicle comprises:
determining, by the at least one controller, the value representative of the minimum composite stopping distance achievable using the combination of the mechanical braking system and the regenerative braking system of the electrically powered vehicle based at least in part on data provided by a battery state sensor.

20. The collision avoidance method of claim 11 wherein determining, by the at least one controller, a value representative of a minimum composite stopping distance achievable using a combination of a mechanical braking system and the regenerative braking system of the electrically powered vehicle comprises:
determining, by the at least one controller, on an intermittent, periodic, or continuous basis, the value representative of the minimum stopping distance achievable using a combination of the mechanical braking system and the regenerative braking system of the electrically powered vehicle.

21. The collision avoidance method of claim 11 wherein determining, by the at least one controller, a value representative of an obstruction threshold distance that is greater than the determined minimum regenerative stopping distance comprises:
determining, by the at least one controller, on an intermittent, periodic, or continuous basis, the value representative of the obstruction threshold distance that is equal to or greater than the determined minimum regenerative stopping distance.

22. A collision avoidance system for use with an electrically powered vehicle, the collision avoidance system comprising:
a number of sensors, each of the number of sensors which, in operation, provide signals that contain data indicative of one or more electric vehicle operational parameters;
at least one controller, communicably coupled to each of the number of sensors, that, in operation, receives the signals provided by each of the number of sensors;
a nontransitory storage medium that includes controller-executable instructions, that when executed by the at least one controller, cause the at least one controller to:
determine, using at least some of the signals received from the number of sensors, a value representative of a minimum regenerative stopping distance achievable using only a regenerative braking system of the electrically powered vehicle;
determine, using at least some of the signals received from the number of sensors, a value representative of a minimum composite stopping distance achievable using a mechanical braking system in combination with the regenerative braking system of the electrically powered vehicle;
determine a value representative of an obstruction threshold distance that is greater than the determined minimum regenerative stopping distance;
responsive to receipt of a signal that includes data indicative of at least one object in a travel path of the electrically powered vehicle or the imminent entry of at least one object into the travel path of the electrically powered vehicle from one or more of the number of sensors, determine a distance to the at least one object;
responsive to a determination that the distance to the at least one object is less than the determined obstruction threshold distance and greater than the determined minimum regenerative stopping distance, autonomously place the electrically powered vehicle in a first braking mode in which a velocity of the electrically powered vehicle is reduced at a first rate of deceleration using only the regenerative braking system;
responsive to a determination that the distance to the at least one object is less than the determined minimum regenerative stopping distance, autonomously place the electrically powered vehicle in a second braking mode in which the velocity of the electrically powered vehicle is reduced at a second rate of deceleration, which is greater than the first rate of deceleration using both the regenerative braking system and the mechanical braking system; and
responsive to a determination that the distance to the at least one object is less than the determined composite braking minimum stopping distance, autonomously place the electrically powered vehicle in a third braking mode in which the velocity of the electrically powered vehicle is reduced at a third rate of deceleration that is greater than the second rate of deceleration using a combination of the mechanical braking system and the regenerative braking system.

23. A collision avoidance method for use with an electrically powered vehicle, the collision avoidance method comprising:

determining, by at least one controller, using signals containing data indicative of one or more electrically powered vehicle operational parameters and received from at least some of a number of sensors, a value representative of a minimum regenerative stopping distance achievable using only a regenerative braking system of the electrically powered vehicle;

determining, by the at least one controller, using the signals containing data indicative of one or more electrically powered vehicle operational parameters and received from at least some of the number of sensors, a value representative of a minimum composite braking stopping distance achievable using a mechanical braking system in combination with the regenerative braking system of the electrically powered vehicle;

determining, by the at least one controller, a value representative of an obstruction threshold distance that is at least equal to the determined minimum regenerative braking stopping distance;

receiving, by the at least one controller, a signal that includes data indicative of at least one object in a travel path of the electrically powered vehicle or the imminent entry of the at least one object into the travel path of the electrically powered vehicle;

determining, by the at least one controller, a value representative of a distance between the electrically powered vehicle and the at least one object;

determining whether the value representative of the distance to the at least one object is less than the determined obstruction threshold distance and greater than the determined minimum regenerative stopping distance;

responsive to determining that the value representative of the distance to the at least one object is less than the determined obstruction threshold distance and greater than the determined minimum regenerative stopping distance, autonomously placing the electrically powered vehicle in a first braking mode in which a velocity of the electrically powered vehicle is reduced at a first rate of deceleration using only the regenerative braking system;

determining whether the value representative of the distance to the at least one object is less than the determined minimum regenerative stopping distance;

responsive to a determination that the distance to the at least one object is less than the determined minimum regenerative stopping distance, autonomously placing the electrically powered vehicle in a second braking mode in which the velocity of the electrically powered vehicle is reduced at a second rate of deceleration that is greater than the first rate of deceleration, using both the regenerative braking system and the mechanical braking system; and responsive to a determination that the distance to the at least one object is less than the determined minimum composite stopping distance, autonomously placing the electrically powered vehicle in a third braking mode in which the velocity of the electrically powered vehicle is reduced at a third rate of deceleration that is greater than the second rate of deceleration using a combination of the mechanical braking system and the regenerative braking system.

* * * * *